June 27, 1933. W. M. MOUNT ET AL 1,916,065
COMBINATION SEPARATOR
Filed April 2, 1931 4 Sheets-Sheet 3

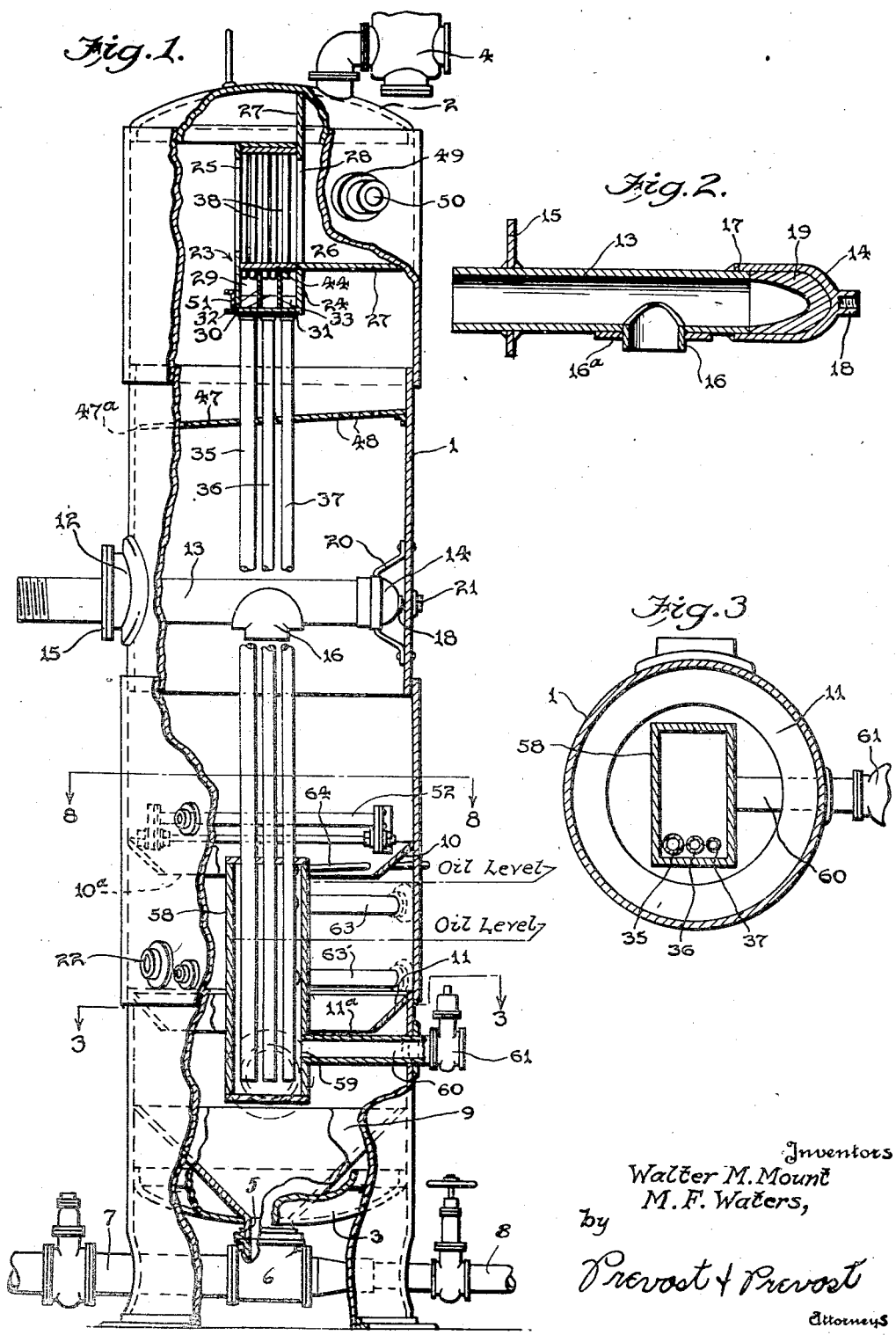

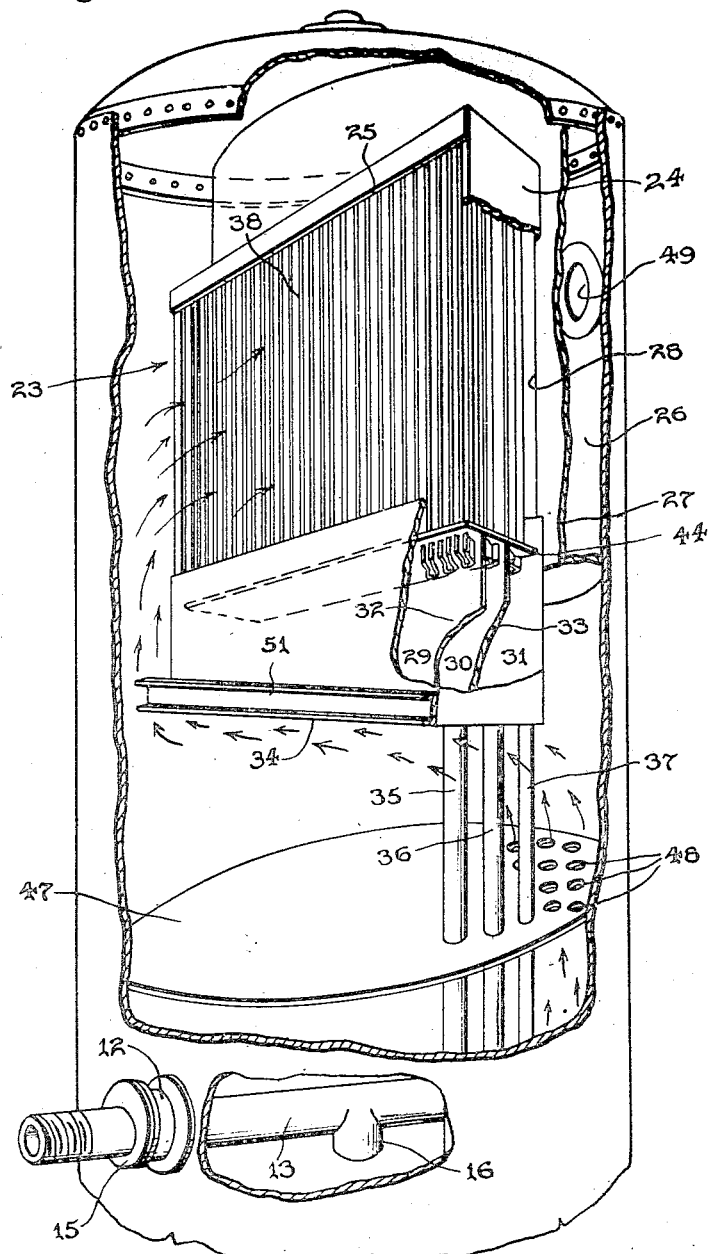

Inventors
Walter M. Mount
M. F. Waters,

By Prevost & Prevost
Attorneys

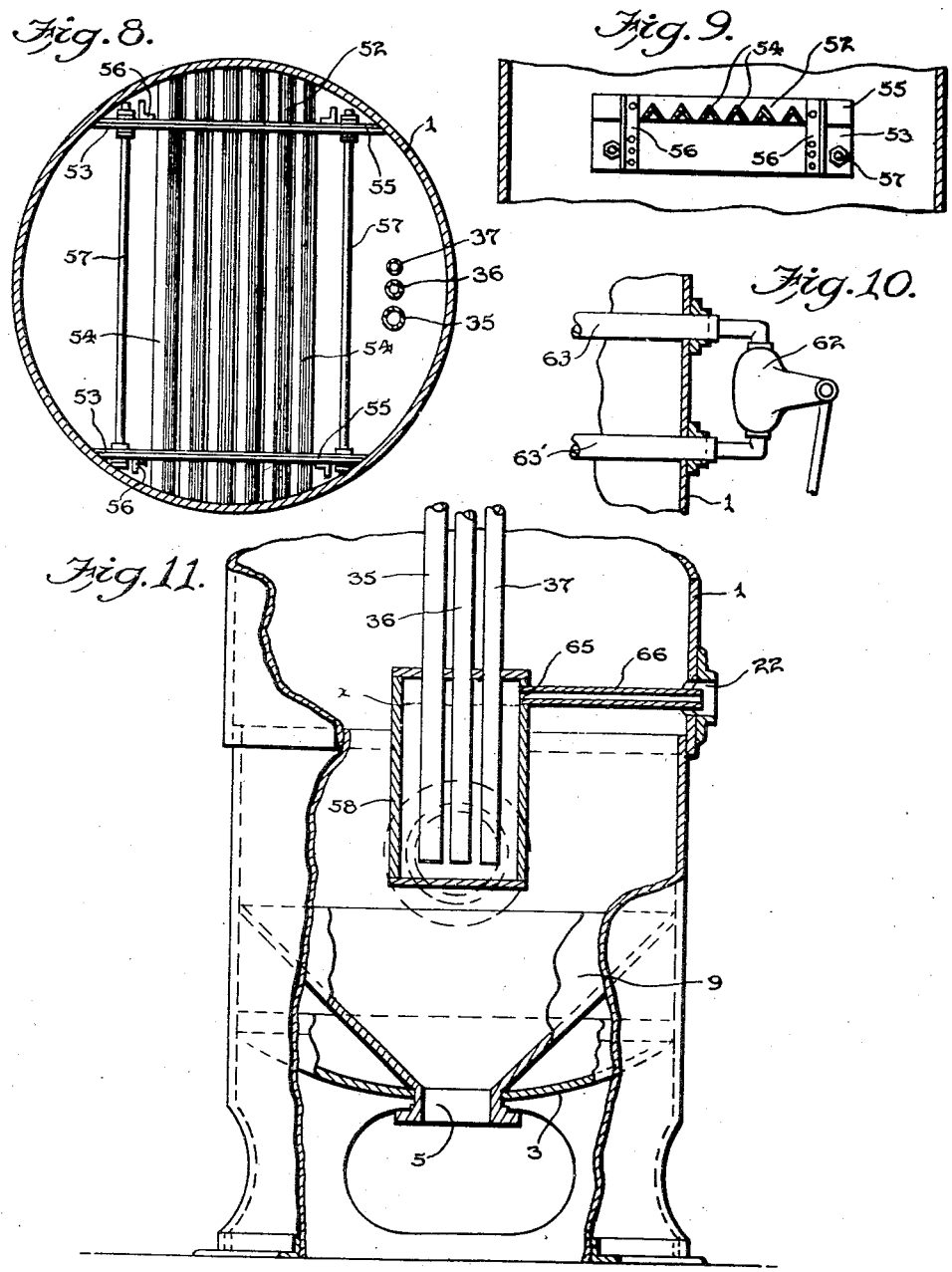

Patented June 27, 1933

1,916,065

UNITED STATES PATENT OFFICE

WALTER M. MOUNT AND MILLARD F. WATERS, OF TULSA, OKLAHOMA, ASSIGNORS TO HANLON-WATERS, INC., OF TULSA, OKLAHOMA

COMBINATION SEPARATOR

Application filed April 2, 1931. Serial No. 527,336.

Our invention consists in new and useful improvements in a combination separator particularly adapted for use in the oil and gas industry and has for its object to provide a separator which is so constructed and designed as to facilitate the handling and separation of mud, sand and gas from large high pressure wells when said wells are first opened, and then after the wells have come on to oil and gas, which of course carry with them varying quantities of sand, will serve as an oil, gas, and sand separator.

Heretofore in bringing in wells discharging large volumes of oil, gas, sand and mud at high pressure it has been necessary to first connect the well into what was called a mud trap and after the well had cleaned itself of mud and the first load of sand, it was then cut out of the mud trap and connected directly into an ordinary oil and gas separator. The average oil and gas separator is not designed to handle large volumes of sand in addition to the oil and gas and due to the tendency of the sand to cut the fittings, pipe and separators, operators encountered considerable trouble as a consequence of the fittings and separators being eaten through by the sand.

It is the primary object of our invention to overcome the disadvantages heretofore prevalent and to greatly simplify the procedure and apparatus required in bringing in large volume high pressure wells. To this end we have provided a combination separator of the type above mentioned wherein the mixture from a well is permitted to immediately enter the separator when the well is brought in, without the necessity of permitting the well to flow free to air in order to clean itself and without the usual cutting into the mud trap and then into an oil and gas separator, thus obviously effecting a considerable saving both in time, money, apparatus and manpower.

A further object of our invention is to provide a novel inlet nipple specially constructed to afford a cushioning effect upon the in-flowing mixture of oil, gas and sand, thus minimizing the cutting of the various parts of the separator, said inlet nipple further acting to prevent the setting up of a turbulence in the separator thus serving as an added precaution against sand cutting.

Another object of our invention is to provide a novel oil and gas separating unit for use in connection with the combination separator which is particularly designed to utilize the difference in kinetic energy between the gases and liquids or solids flowing therethrough, said separating unit breaking the gas and entrained liquids into a multiplicity of minute streams as it passes therethrough and thoroughly denuding said gas of any liquid particles and conducting said separated liquid particles down to the oil receptacle located in the main separator. While we prefer to use a separating unit of the type referred to and hereinafter described in detail, it is obvious that various forms of separating units may be employed in connection with our combination separator if desired.

It is another object of our invention to provide an angle grid or baffle with which the mixture of oil and gas entering the tank comes in contact immediately after being deflected by the inlet nipple, which permits the oil and gas to spend its energy and thus eliminates foaming.

A still further object of our invention is to provide an auxiliary liquid receptacle for accommodating the liquid separated from the gas by the separating unit above referred to, including means for automatically controlling the discharge of said liquid from said auxiliary receptacle. This auxiliary receptacle is sealed with respect to the interior of the main tank, whereby a backing-up of the oil in the down pipes of the separating unit is prevented.

With the above and other objects in view which will appear as the description proceeds, our invention consists in the novel features herein set forth, illustrated in the accompanying drawings, and more particularly pointed out in the appended claims.

Referring to the drawings in which numerals of like character designate similar parts throughout the several views, Fig. 1 is a vertical sectional view showing the complete assembly of our combination separator and the relative positions of the various parts thereof.

Fig. 2 is an enlarged sectional detail of the inlet nipple.

Fig. 3 is a sectional view taken on line 3—3 of Fig. 1 showing a plan view of one of the surge plates and the auxiliary receptacle in section.

Fig. 4 is an enlarged view of the upper portion of the combination separator with parts broken away to illustrate our improved form of oil and gas separating unit.

Fig. 8 is a sectional view taken on line 8—8 of Fig. 1 showing the angle grid from the top side.

Fig. 9 is a vertical sectional view taken from one end of the angle grid shown in Fig. 8.

Fig. 10 is a detail showing one form of liquid level controller for the auxiliary liquid receptacle, and Fig. 11 is an enlarged sectional view of the lower end of the tank illustrating a modified form of auxiliary receptacle.

Figure 5:
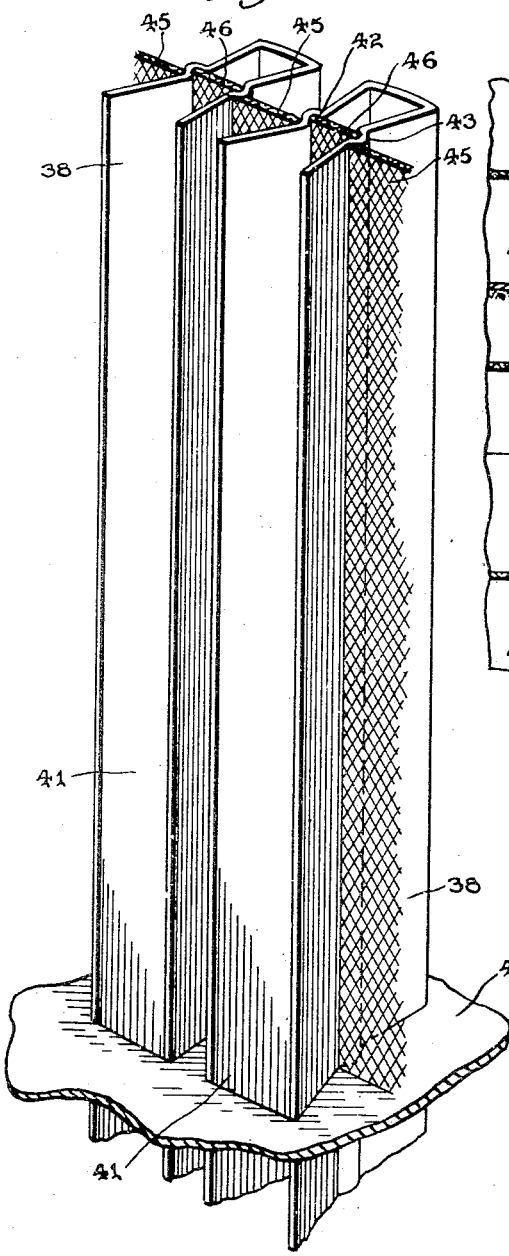
Fig. 5 is an enlarged detail showing two of the elements employed in the separating unit.

In the drawings, 1 represents the shell or body of our improved separator and as shown in Fig. 1 is preferably made up of a plurality of annular sections welded, riveted or otherwise secured together to facilitate the assembly of the various parts which constitute the complete separator. The usual top and bottom 2 and 3 respectively complete the shell of the separator tank, the former being equipped with a conventional relief valve 4 preferably of the automatic pilot type and the latter having a drain outlet opening 5 connected into a flanged T 6, one side of which leads to a valved pipe line 7 running to a slush pit, the other connected to a valved pipe line 8 in communication with a settling tank, said slush pit and settling tank not being shown in the drawings as they form no part of our invention.

Adjacent the bottom 3 we provide a substantially conical false bottom 9 of approximately a 45° angle, said bottom having a throat at its lower extremity which opens into the drain outlet 5 and is thereby in communication with the T connection for the purpose hereinafter set forth, its upper edge being welded or otherwise suitably secured to the inner wall of the shell 1.

At predetermined points in the shell 1 above the false bottom 9 we provide substantially conical surge plates 10 and 11, and although the drawings illustrate only two of these plates, it will be understood that more or less may be employed if desired. These surge plates are welded around their upper edges to the inner wall of the shell, their lower extremities depending downwardly and being free, forming relatively large annular openings 10a and 11a respectively, through which the down-flowing fluid and solid matter may readily pass to the bottom of the tank. It will be noted that as in the case of the false bottom 9 the surge plates are preferably of a 45° angle in vertical cross section, which angle has been found to offer a minimum resistance to the downward passage of fluid with a maximum surge preventing effect.

In one wall of the shell 1 preferably about midway of its extremities, we provide an inlet manhole 12 through which we insert our improved inlet nipple 13, the latter comprising a substantially cylindrical body portion extending horizontally or transversely into the shell, its inner end being closed by a bull plug or the like 14 hereinafter described in detail, and its outer end extending through a manhole cover 15 which is welded thereto, said outer end being threaded for connection to a flow line leading from the oil well not shown. The underside of the nipple 13 is provided with a discharge nozzle 16 located substantially centrally of the separator tank and discharging downwardly therein, said nozzle being either integrally cast in the body of the nipple or flanged and welded thereto as at 16a, Fig. 2.

The bull plug 14 is preferably hollowed out as shown in cross section in Fig. 2 and its inside diameter is sufficiently large to encircle the free inner end of the nipple 13 as at 17, the closed end of said bull plug being provided with a screw-threaded collar 18 to receive a suitable tool which we employ to facilitate the insertion and removal of the inlet nipple as hereinafter described. The bull plug 14 is lined with a relatively soft material 19 preferably lead, which lining is applied by the use of a mold into which molten lead is poured. The mold is afterwards withdrawn and the inner surface is machined on a lathe to provide a smooth surface of contact. The lined bull plug is then slipped over the end of the nipple as at 17 until the latter comes in contact with the lead lining which forms a continuation of the inner wall of the nipple, which gradually thickens towards the inner end of the bull plug as clearly shown in Fig. 2.

In order to support the free end of the nipple 13 we provide a suitable bracket 20 which engages the bull plug 14 and is riveted or otherwise secured to the inner wall of the shell 1, said shell being provided immediately adjacent the threaded collar 18 with an aperture and removable plug 21 through which a suitable tool is inserted to engage the collar 18 on the end of the bull plug for removing and replacing the inlet nipple.

At suitable points in the shell 1 below the inlet nipple 13 and preferably immediately above the first surge plate 10, we provide one or more flanged oil outlets 22 through which the oil leaves the separator after the sand, mud and gas have been removed therefrom, there being a sufficient space below said outlets to allow for the accumulation of solid matter. These outlets 22 are preferably automatically controlled by a suitable float mechanism or the like. By the use of suitable gauge glasses (not shown) on the outside of the tank, the operator may ascertain the sand level as it accumulates and can drain it off at intervals through connection 6 to the waste pit.

We have found that when deflecting the mixture of oil, gas, sand and mud downwardly by the inlet nipple 13 and permitting it to fall directly on to the oil level maintained inside the separator tank, there was inclined to be more or less foaming which is very undesirable. To eliminate this condition we have installed an angle grid 52 which as shown in Figs. 8 and 9 comprises a pair of oppositely disposed supports 53 mounted transversely of the shell 1 at a point preferably just above the first surge plate 10 and being secured to said shell by any suitable means such as welding, riveting or the like. Resting on the upper edges of the supports 53 are a plurality of angle irons 54 which extend entirely across the interior of the shell 1 with the apexes of the angles disposed upwardly as clearly shown in Fig. 9, said angle irons being slightly spaced apart and maintained in such spaced relation by a pair of upper clamping members 55 which are cut out at predetermined points along their lower edges to receive the angle irons. These clamping plates 55 are placed over the angle irons 54 with their lower edges abutting the upper edges of the supports 53, and maintained in clamping position by vertically extending strips or angles 56 which are riveted or otherwise secured to these adjacent members. Cross bars or braces 57 may be provided to insure the rigidity of the elements comprising the angle grid.

In the extreme upper portion of the shell 1 we provide an improved oil and gas separating unit 23 which may be of any suitable design. However, the unit illustrated in the accompanying drawings is the preferred type for use in the present combination separator.

This separating unit 23 is substantially box-like in shape and comprises a container 24 having closed top and end walls, its front wall being open as at 25 and its rear wall opening into a gas outlet chamber 26 formed by an angular baffle 27, the vertical portion of said baffle being cut out as at 28 to register with the open portion of the rear wall of the container 24. The lower portion of the container 24 is divided into a plurality of vertical oil collecting compartments 29, 30 and 31 by partitions 32 and 33, the outer walls of said compartments being formed by the front and rear walls of the container as clearly shown in Fig. 4. The bottom 34 of the container is preferably inclined toward one end to facilitate the drainage of the oil collected therein, said bottom being provided with downwardly extending drain pipes 35, 36 and 37 leading from compartments 29, 30 and 31 respectively to the lower portion of an auxiliary liquid receptacle 58, located in the tank adjacent the oil outlets 22.

Figure 6:
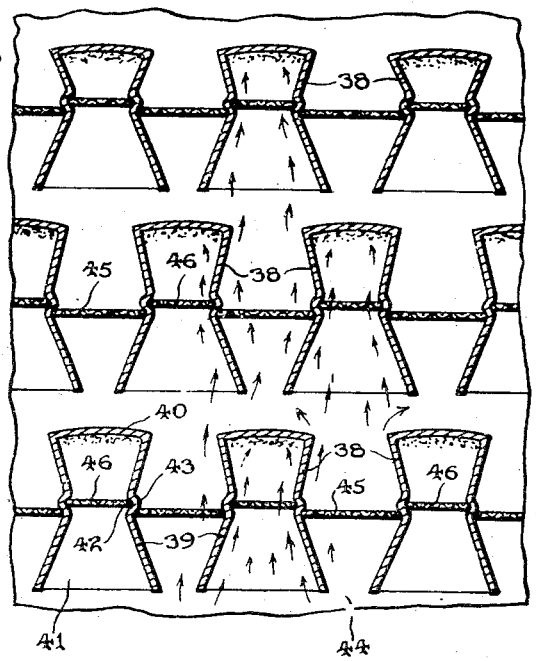
Fig. 6 is a horizontal section of a series of separating elements showing their relative positions in the unit.
Figure 7:
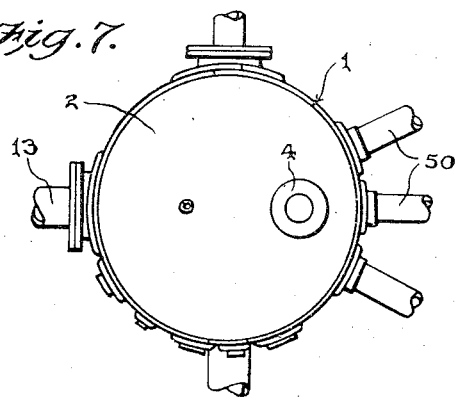
Fig. 7 is a top plan view of the combination separator.

38 represents a plurality of separating elements arranged vertically in the container 24 in a series of rows, the structure and relative location of said separating elements being best understood by referring to Figs. 5 and 6 from which it will be seen that the elements of each row are arranged in staggered relation with respect to those of the adjacent rows. Each separating element 38 consists of an elongated trough-like structure, the vertical walls 39 of which flare outwardly from the center toward the front and rear, the rear of the element being closed by a wall 40 and the front opening into a flared mouth 41.

The central portions of the walls 39 are bent outwardly to form a vertically extending groove 42 on the inner face of each wall and a corresponding ridge 43 on the outer face, whereby when the elements are assembled in the container 24 and held in their proper relative positions by suitable spacers 44, rigid screen panels 45 of any suitable mesh may be supported vertically between adjacent elements and prevented from displacement by the ridges 43 and the flaring walls 39. Likewise in the central portion of each element we provide rigid screen panels 46 which are held in place vertically by the oppositely disposed grooves 42.

The screen panels 45 located in the channels formed by the walls of adjacent elements 38, serve to break up the gas passing through the separating unit into minute streams which greatly facilitates the separating of oil particles which may be entrained therewith, and the screen panels 46 located within the central portion of each separating element, forms a partition behind which is created a quiet area, and liquids coming against the screen under pressure will be forced through into the quiet area and will either continue on to the back of the element from whence they will be conducted into the oil compartments in the lower portion of the container 24, or they will trickle down the rear side of the screen panel into said compartments to be conducted through the respective drain pipes to the auxiliary receptacle 58.

It will be noted that the separating elements 38 terminate at their lower ends, just below the opening in the front wall of the unit 23, said unit being supported in the tank by a suitable beam 51.

The auxiliary receptacle 58 comprises a closed container provided at its upper end with suitable openings to receive the downpipes 35, 36 and 37, and in the lower portion of one of its side walls with a discharge opening 59 into which is connected a discharge conduit 60 which leads to any desired point on the exterior of the tank 1. The discharge conduit 60 is preferably provided with a float controlled valve 61 operated by a float and float cage arrangement 62 (Fig. 10), said float cage being in communication with the interior of the auxiliary receptacle 58 through the medium of pipes 63 and 63', whereby the level of the liquid in the receptacle 58 is automatically maintained at the desired height. While we have shown one particular form of float controlled valve and float cage assembly, it is to be understood that this is simply for the purpose of illustration, and any suitable liquid level control may be employed. Furthermore, while we have shown the auxiliary liquid receptacle 58 as located within the tank 1, it is obvious that this receptacle may be located exterior of the tank with equal effect, in which instance, the drain pipes 35, 36 and 37 would extend outwardly through the wall of the separator. At the upper extremity of the receptacle 58 we provide a connection 64 which leads to the exterior of the tank and through which any gas which may have found its way into the receptacle, may be conducted away to prevent the device from becoming gas-bound. This gas may be piped to any convenient point or connection.

Referring to Fig. 11 which illustrates a modified form of auxiliary receptacle 58, it will be seen that, in this embodiment of our invention the float control has been eliminated. In this structure the receptacle is provided with a single discharge opening 65 at its upper extremity which is connected into a conduit 66, the latter extending into the regular oil outlet flange 22 in the side of the separator shell. As the oil flows out through the outlet 22 it forms a jetting which keeps the oil drain from the closed container 58 down to the level shown at X in Fig. 11.

47 represents an inclined circular baffle plate located transversely of the tank 1 intermediate the separating unit 23 and the inlet nipple 13, said baffle being provided with a series of perforations 48 in its elevated portion, the other portion thereof being imperforate as clearly shown in Fig. 4.

Adjacent the gas outlet chamber 26 we provide one or more gas outlet openings 49 into which are connected pipe lines 50 which lead to any suitable receptacle not shown.

Having thus described the construction and relative positions of the various parts of our improved combination separator, its operation is as follows:—

The mixture of oil, gas, sand and mud coming directly from the well under high pressure and in large volumes, enters the tank 1 through the inlet nipple 13 and is discharged toward the angle grid 52 in the lower portion of the tank through the nozzle 16 which as before stated, is located substantially in the center of the tank, and the liquids and solids proceed to the bottom of the tank, the gas, as soon as liberated, rising to the upper portion of the tank. It will be noted that when the fluid mixture enters the nipple 13 it naturally proceeds to the extreme end of the nipple until that part of the nipple is full, after which the closed end forms a liquid cushion against which the constant flow from the well comes in contact before being diverted through the nozzle 16 towards the bottom of the separator. Obviously, this fluid cushion minimizes the cutting effect of the sand and at the same time tends to prevent the setting up of a turbulence of the fluid upon entering the tank. Due to the structure of the bull plug which closes the end of the nipple 13, and by providing a lead lining which practically forms a continuation of the inner surface of the nipple 13, a smooth stream-line surface is provided which greatly facilitates the reduction of sand-cutting and erosion and prevents the setting up of a turbulence.

When the oil with entrained gas comes in contact with the upper surface of the angle irons 54, the force of the fall of the bulk of fluid is broken and it is diverted into a plurality of converging streams which pass downwardly through the spaces provided between the adjacent angle irons. As the converging streams meet, the energy of the down-flowing fluid is spent and it falls through these spaces on to the top of the oil level below, thereby reducing to a minimum the foamy condition which would otherwise occur due to the force of the fluid entering the tank and falling directly on to the oil level to the bottom of the separator.

In other words, we are utilizing the kinetic energy of two streams of oil coming together to dissipate the energy of the flow and from the point of contact or meeting of the two streams, there is a substantially quiet flow, before the oil, sand and mud reaches the volume of oil already collected in the bottom of the separator.

When the well is first drilled in and starts to flow into the separator through the inlet nipple 13, the valve in line 7 leading to the slush pit is open and the bulk of the mud and sand entering the separator immediately falls to the bottom and is carried off through line 7 to the slush pit, any gas carried with this material being handled through the separating unit 23 as hereinafter described.

As soon as the well comes on to oil we close the mud valve and the oil collecting in the bottom of the tank is discharged through the oil outlets 22 when it reaches this level, and is conducted to suitable stock tanks, not shown. It will be noted that sufficient space is provided between the oil outlets 22 and the false bottom 9 to permit the accumulation of sand brought into the separator with the mixture, which sand may be drawn off at intervals and conducted to a waste pit, thereby minimizing the quantity of sand carried to the stock tanks with the oil.

As the liquid collects in the bottom portion of the tank 1 with more liquid constantly entering, there is a tendency for said liquid to surge in the tank and to prevent this we provide the surge plates 10 and 11. As before stated, these plates are conical in shape and depend downwardly at substantially a 45° angle with a relatively large opening in the center thereof whereby the incoming fluid and soil matter flows freely to the bottom of the tank without interference, but if the fluids start to surge back up alongside the walls of the separator, the angular surge plates retard such surging movement.

The gas initially separated from the inflowing mixture discharged through nozzle 16 rises upwardly and comes in contact with the undersurface of the inclined baffle 47 and naturally seeks the elevated perforations 48, being scrubbed along the underside of said baffle in its passage, which tends to knock back the greater portion of the heavy liquids entrained in the gas. Passing through the perforations 48, the gas comes in contact with the undersurface of the horizontal portion of the baffle 27 and the bottom of the container 24 which knock further liquid particles back upon the upper surface of the baffle 47 from whence it drains by gravity to the lower portion of the baffle and down to the bottom of the separator through the space 47a provided between the edge of the baffle 47 and the wall of the tank 1.

The gas, still containing liquid particles, then enters the separating unit 23 through the opening 25 in the front wall of the container 24, the greater portion thereof passing into the first row of separating elements 38 through the flared mouths 41, the remainder of the gas passing through the channels formed by the walls of the adjacent elements and entering the flared mouths of the row or elements next behind, being broken up into a plurality of minute streams by the screen panels 45, which greatly facilitates the initial separation of the oil particles from the gas. The liquid particles carried by the gas entering the separator elements 38 pass through the secreen panels 46 in the elements and enter the quiet area therebehind, and either continue to the back of the element or trickle down the rear side of the screen panel into the respective compartments below the spacer 44 from whence they are drained to the auxiliary receptacle 58 in the lower portion of the tank through pipes 35, 36 and 37.

It will be noted that with this structure of separating elements there is a constant down pressure on the inside of each element caused by the pressure of the incoming gases and entrained liquids. This down pressure supplements the drainage by gravity and affords a full drainage area for the entire volume of liquid collected behind the screen panels. The spaces between the separating elements provide substantially a nozzle-effect whereby the gas streams, laden with liquids or solids, as they proceed through the nozzle-like channels between the separating elements, will increase in velocity and as they leave the nozzles, said liquids or solids will carry on at a high velocity into the separating elements immediately behind this channel, while the gas streams will be given an opportunity to expand and proceed around to the sides of the separating elements of the next row.

It will be noted that the principle upon which our improved oil and gas separator unit operates, is based upon the utilization of the difference of kinetic energy of gases and liquids or solids, to cause an effective and thorough separation of the liquid particles from the gas.

The denuded gas continues on through the separating unit and after passing the last row of separator elements, is ejected through the opening in the rear wall of the container 24, and passes through the cut out portion 28 of the baffle 27 and into the discharge chamber 26 formed by said baffle. It is then conducted through the outlet or outlets 49 and pipe lines 50 to suitable receptacles.

The liquid drained from the compartments 29, 30 and 31 through the drain pipes 35, 36 and 37 collects in the auxiliary receptacle 58 from whence it is discharged through the conduit 60, the discharge through said conduit being regulated by a valve 61 of any suitable type but preferably controlled by the level of the fluid in the receptacle through the medium of a float and float cage arrangement such for example as illustrated in Fig. 10, at 62. Thus, as the level rises to a predetermined height in the receptacle 58, the float is caused to rise in its cage and automatically opens the valve 61 to permit the discharge of fluid until the level is lowered in the receptacle 58.

In order to prevent the auxiliary receptacle from becoming gas-bound, we have provided the gas outlet conduit 64 before mentioned, which may be connected into the main gas discharge conduit, or conduct the gas to any desired point.

It will be noted that with this arrangement we have provided a positive control for the liquid that is drained from the separating unit and at the same time maintain a liquid seal whereby no gas is permitted to flow from either one of the down pipes 35, 36 and 37 into one of the others. This structure also eliminates the possibility of oil backing up from the bottom of the separator into the down pipes from the separating unit which would interfere with conducting the liquid away from these down pipes, the liquid level in the auxiliary receptacle being entirely independent of the liquid level in the main separator tank and its discharge being automatically controlled.

The operation of the embodiment of our invention illustrated in Fig. 11 is the same as that just described with the exception that instead of a float controlled valve for regulating the discharge of the fluid from the auxiliary receptacle, we employ a single outlet conduit 66 which extends into the regular oil outlet flange 22 of the separator tank and as the oil flows through this oil outlet, it forms a jetting which keeps the oil drained from the enclosed auxiliary receptacle down to the level as shown at X in Fig. 11.

The installation of our improved angle grid and the auxiliary liquid receptacle for accommodating the liquid separated by the separating unit 23 greatly increases the efficiency of the entire apparatus, particularly in the handling of very heavy wells.

Another important feature of our improved combination separator is the inlet nipple 13 and the ease with which it may be inserted and removed by the operator, which is accomplished in the following manner:—

The plug 21 is removed and a suitable tool which may simply be in the form of a pipe or rod threaded at one end, is inserted through the opening in the shell and screwed into the collar 18 on the end of the bull plug 14. The manhole cover 15 is then disengaged from the flanged opening 12 and the entire nipple is slid out of the opening 12, the inner end thereof being supported by the pipe engaging the collar 18. It will be noted that in actual construction the nipple 13 is usually of rather large diameter and length and is consequently very heavy and awkward to handle. Hence such handling is greatly facilitated by the method just described, when it is necessary to replace a nipple which may have become worn by long usage.

In the appended claims we have referred to a settling chamber for solids, a liquid collecting chamber and a gas outlet chamber, and it will be understood that by these terms we mean to designate as the 'settling chamber', substantially that portion of the tank between the false bottom and the lower surge plate 11; the 'liquid collecting chamber', substantially that portion of the tank between the settling chamber and the inlet opening 12; and the 'gas outlet chamber', the compartment formed by the baffle 27 adjacent the gas outlet openings 49.

From the foregoing it is believed that the construction and operation of our improved combination separator may be clearly understood by those skilled in the art without further description, it being borne in mind that numerous changes may be made in the details of construction without departing from the spirit of the invention as set out in the following claims.

What we claim and desire to secure by Letters Patent is:—

1. In a combination separator of the class described, an inlet nipple comprising a substantially elongated hollow body portion closed at one end, a discharge nozzle in one of the longitudinal walls of said body portion, the closed end being provided with a lining of suitable material, said lining being concaved longitudinally of the bore of said nipple.

2. In a combination separator of the class described, an inlet nipple comprising a substantially elongated hollow body portion closed at one end, a discharge nozzle in one of the longitudinal walls of said body portion, the closed end being provided with a lining of suitable material, said lining forming an unbroken stream-line continuation of the inner surface of said body portion.

3. In a combination separator of the class described, an inlet nipple comprising a substantially elongated hollow body portion a recessed closure for one end of said body portion, a discharge nozzle in one of the longitudinal walls of said body portion, said closure being provided with a lining of relatively soft metal, said lining forming an unbroken stream line continuation of the inner surface of said body portion, and gradually thickening towards its extremity.

4. In a combination separator of the class described, an oil and gas separating unit comprising a main chamber, a plurality of rows of baffles located in spaced and staggered relation in said chamber, said baffles forming a series of passageways extending transversely of said chamber and a series of passageways extending longitudinally of said chamber, each of said last named passageways intersecting each of said first named passageways, and vertical screen panels arranged between the baffles of each row and extending across the respective longitudinal passageways intermediate said points of intersection.

5. In a combination separator of the class described, an oil and gas separating unit comprising a main chamber, a plurality of rows of substantially trough-like imperforate baffles located in spaced and staggered relation in said chamber, said baffles forming a series of passageways extending transversely of said chamber and a series of passageways extending longitudinally of said chamber, each of said last named passageways intersecting each of said first named passageways. vertical screen panels arranged between the baffles of each row and extending across the respective longitudinal passageways intermediate said points of intersection, and vertical screen panels within each of said trough-like baffles and dividing the same transversely into compartments.

6. Apparatus as claimed in claim 5 including a liquid receptacle in the lower portion of said chamber, said receptacle being divided into a plurality of compartments, each of which extends longitudinally of and in communication with the respective row of baffles arranged above, and means for conducting liquid from said compartments.

7. A combination separator including a vertically disposed tank, a fluid inlet intermediate the vertical extremities of said tank, a settling chamber below said inlet, a liquid and gas separating unit in said tank above said inlet and including a series of vertically disposed baffles arranged in rows and in staggered relation, a receiver for the liquids intercepted by said baffles, said receiver being divided into compartments, each of which is in communication with the respective row of baffles arranged above, means for conducting gas from said separating unit, separate means for draining liquid from each of the compartments of said receiver, an auxiliary liquid receptacle for receiving said drained liquid, said auxiliary receptacle being entirely sealed from communication with said settling chamber, and a discharge conduit leading from said receptacle to a point exterior of the tank.

8. A combination separator including a vertically disposed tank, a fluid inlet intermediate the vertical extremities of said tank, a main liquid outlet in the lower portion of said tank, a settling chamber below said inlet, a liquid and gas separating unit in said tank above said inlet, means for conducting gas from said separating unit, means for draining liquid from said separating unit, an independent liquid receptacle arranged within said tank but entirely sealed from communication with said settling chamber, for receiving said drained liquid, and a discharge conduit leading from said independent receptacle into said main liquid outlet and forming a jetting, whereby the level of the liquid in the independent receptacle is controlled.

9. In an oil and gas separator, an upright tank having a gas outlet, a horizontal influent nozzle adjacent mid-height of the tank extending across said tank, said nozzle having one end closed to form an influent cushion, baffles above the nozzle, a separate chamber in the tank below the nozzle, a drain pipe leading from the baffles to the chamber, and an outlet for the chamber.

10. In apparatus for separating liquid and gas, a separator unit comprising a container, a plurality of substantially trough-like baffles vertically disposed in said container and arranged in spaced rows in staggered relation, each of said baffles having a flaring mouth and side walls which converge gradually toward their central portions and then flare outwardly toward their closed rear walls, said baffles forming passageways, each of which is in direct line with the opening of the baffle next behind, vertically disposed transverse screen panels in said passageways and baffles, means on the side walls of said baffles for supporting said screen panels, a liquid receiving chamber in said container below said baffles, in communication with the lower ends of said baffles, and a gas discharge outlet for said container in communication with said passageways.

In testimony whereof we affix our signatures.

WALTER M. MOUNT.
MILLARD F. WATERS.